April 14, 1964     A. H. OLSEN ET AL     3,129,085
METHOD FOR FORMING SPIRAL LAMP TUBES
Filed Jan. 30, 1961     2 Sheets-Sheet 1

INVENTORS
DONALD G. TRUTNER
ANDREW H. OLSEN
BY
*Darby & Darby*
ATTORNEYS

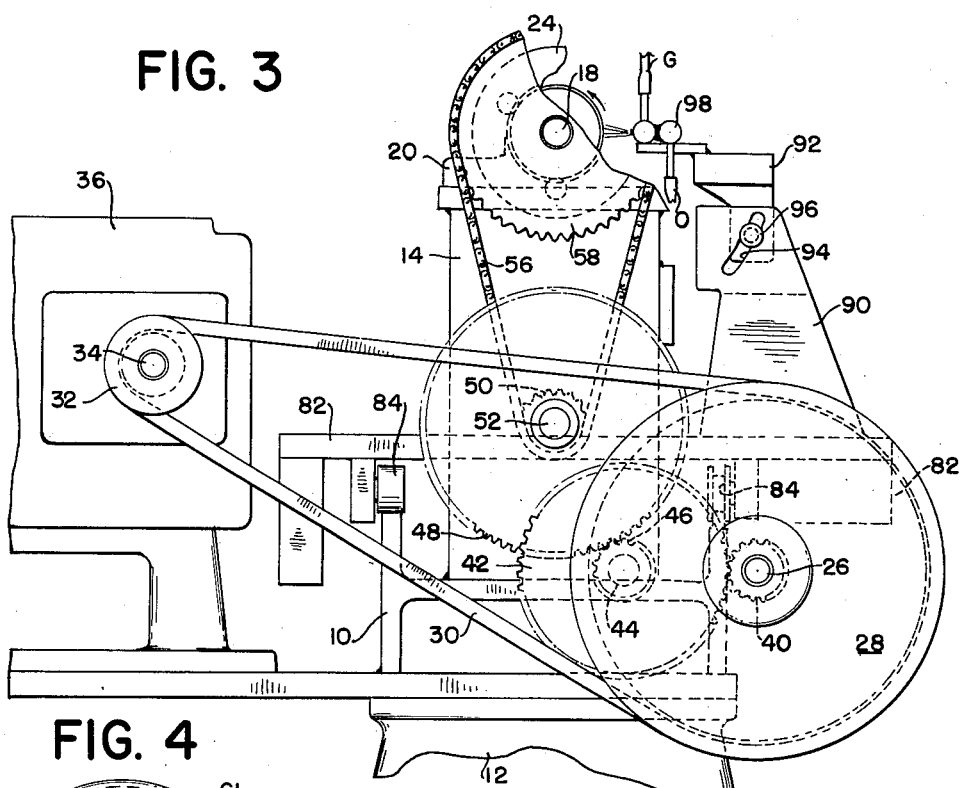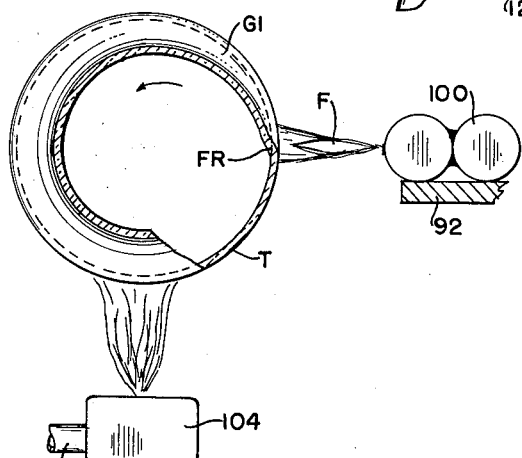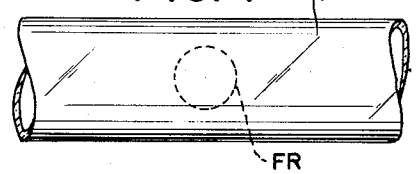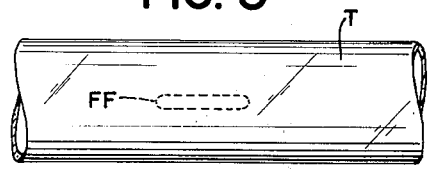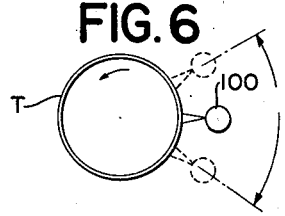

United States Patent Office 3,129,085
Patented Apr. 14, 1964

3,129,085
METHOD FOR FORMING SPIRAL LAMP TUBES
Andrew H. Olsen, Jersey City, and Donald G. Trutner, Chatham, N.J., assignors to Duro-Test Corporation, North Bergen, N.J., a corporation of New York
Filed Jan. 30, 1961, Ser. No. 85,790
5 Claims. (Cl. 65—109)

The general object of this invention is to provide a novel machine and method by means of which glass tubes, for example of the type used as the enclosure for a fluorescent lamp, are converted into a helicoidal formation.

A further object of this invention is to provide a novel method of forming one or more helical grooves in a glass tube by deforming the wall thereof.

A more specific object of the invention is to provide a method wherein a thin walled glass tube is rotated on its axis while simultaneously and progressively applying heat at a point or over a limited area of the glass wall of the tube from one end to the other to soften the glass wall sufficiently to deform the glass wall into an outwardly facing groove.

A more specific object of the invention is to adjust the temperature of heating at the point or area to vary the depth of the groove or grooves being formed.

Still another object of the invention is to preheat the glass tube to a temperature sufficient to anneal it prior to forming a groove or grooves therein.

Still another object of the invention is to apply the heat to the glass tube by means of burning gases and to adjust the temperature and the shape of the resulting flame to vary the shape and depth of the groove being formed.

A broader object of the invention is to provide a method of heating a glass tube at a point for over a limited area sufficiently to soften it and to rotate the glass tube so that the softened area will sag under the forces of gravity and/or surface tension of the heated glass.

Still another object of the invention is to heat such a tube with a gas flame and adjusting the pressure of impingement of the flame thereon to control the depth and shape of the groove formed.

Still another object of the invention is to provide a machine for forming one or more grooves in the wall of a glass tube to provide among other things an envelope for a fluorescent lamp.

Other and more detailed objects of the invention will be apparent from the following disclosure of the invention when taken in connection with the embodiment which is the subject matter of the accompanying drawings.

In the drawings,

FIGURE 3 is a lefthand elevational view of the machine of FIG. 1 with some parts broken away to simplify the drawing and better illustrate the construction;

FIGURE 4 is a cross-sectional view taken on the line 4—4 of FIG. 1 showing diagrammatically how a groove is gradually formed in a glass tube using one form of heating flame;

FIGURE 5 diagrammatically illustrates another cross-sectional shape for a heating flame;

FIGURE 6 diagrammatically illustrates how, by varying the vertical position of the flame the groove can be varied in depth; and FIGURE 7 is a diagrammatic view showing the point or limited area of heating produced by a round flame such as illustrated in FIG. 4.

As is known in this art, the glass tube which forms the envelope of a fluorescent lamp is preferably of non-circular cross-section. Lamps employing such envelopes when operated at normal or above normal loadings either in the preheat or instant start types, operate at higher efficiencies and produce more useful light per unit of power input than is true of envelopes of circular cross-section. The result is that various shapes of such envelopes have been proposed to attain these objects.

It has been found that greater brightness uniformity, higher efficiency and better orientation sensitivity when the lamp is used horizontally are obtained if the envelope is given a helicoidal formation, sometimes referred to as spiral formation. In further explanation of this form and as will be apparent in connection with the drawings, the glass envelope in accordance with this invention is given a form which is comparable to that of a twist drill in the case of an envelope having a pair of helical grooves equidistantly spaced circumferentially. As will be further apparent from the following disclosure the invention is not limited to the use of two grooves since a glass tube can be provided with a single groove or more than two grooves having any desired circumferential spacing.

It is believed that heretofore it has been impossible to form a glass tube preferably but not necessarily of circular cross-section into what appears to be a uniformly twisted formation. This bulb geometry is obtained in accordance with the methods herein disclosed and by the apparatus hereinafter described.

Figure 1:
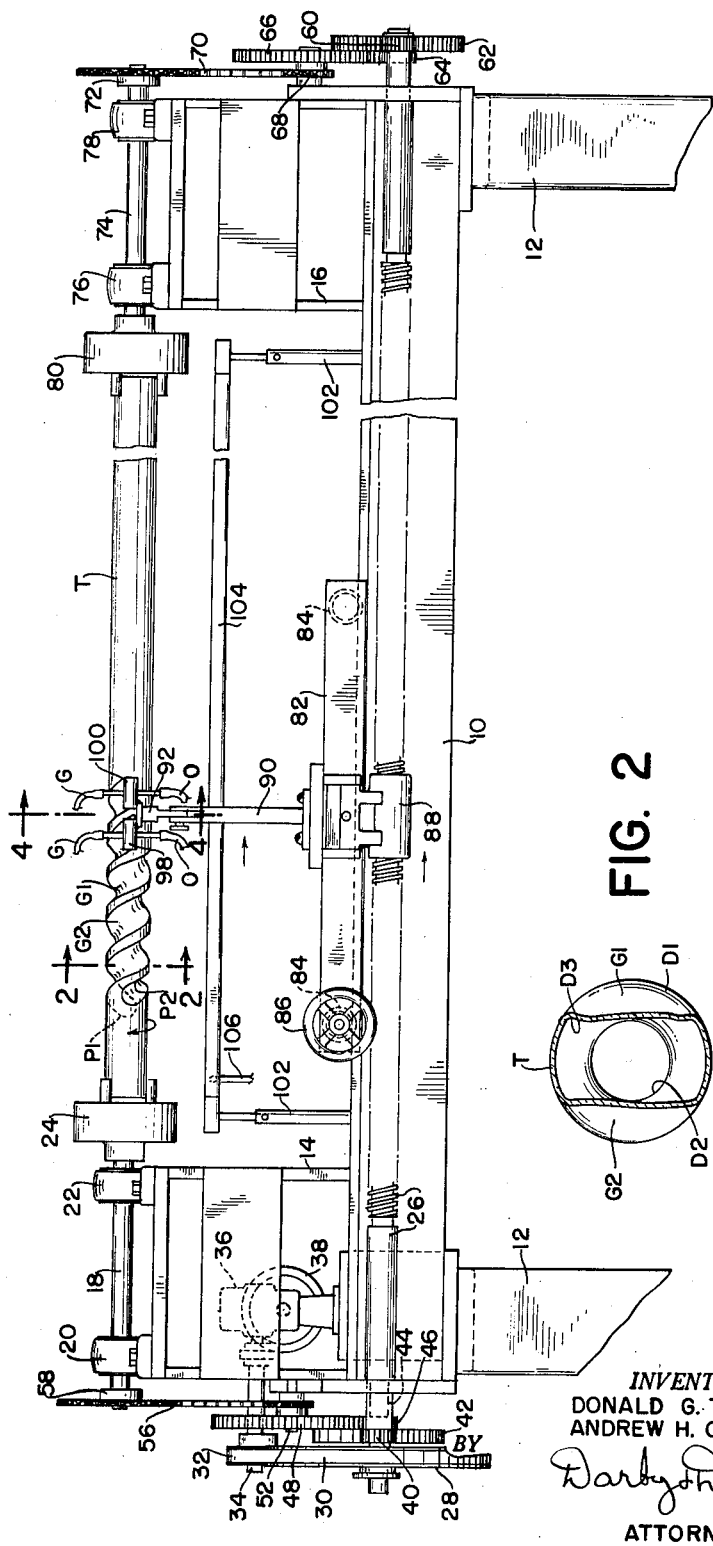
FIGURE 1 is a front elevational view of a machine in accordance with this invention with the supporting legs broken away.

The machine includes a base 10 which, as shown in FIG. 3, is generally of I-beam formation laid on its side. This beam forms the bed of the machine which is supported by any suitable substructure such as the legs 12. Mounted on top of the beam at the lefthand end is a built-up standard 14 and a similar built-up standard 16 supported at the other end of the beam in alignment with the first standard. Journaled on top of the standard 14 in a pair of bearings 20 and 22 is a shaft 18 which has mounted on its righthand end any suitable form of chuck for gripping a glass tube. Journaled in suitable bearings on the front of the bed 10 is a lead screw 26 which extends throughout the length of the bed and projects beyond each end, as shown in FIG. 1.

Keyed to the lefthand end of the lead screw 26 is a pulley 28 which is connected by a belt 30 to a smaller drive pulley 32. Pulley 32 is keyed to a shaft 34 which is connected to a suitable drive motor 38 through a reduction gearing assembly 36.

Also keyed to the lead screw 26 is a drive pinion 40 which meshes with a driven gear 42 rotatably mounted on a stud shaft 44. Secured to the gear 42 is a pinion 46 which meshes with a gear 48 mounted on a stud shaft 52 supported by the standard 14. Connected with the gear 48 is a sprocket 50 connected by a chain 56 to a larger sprocket 58 secured to the shaft 18.

On the other end of the lead screw 26 is a drive pinion 60 meshing with a driven gear 62, corresponding to the gear 42, rotatably mounted on a stud shaft supported at the other end of the bed. Secured to the gear 62 for rotation with it is a pinion 64 which meshes with a gear 66, corresponding to the gear 48, also mounted on a suitable stud shaft, corresponding to the shaft 52. Connected to the gear 66 for rotation with it is a drive sprocket 68 connected by a chain 70 to a driven sprocket 72. Sprocket 72 is keyed to a shaft 74 rotatably mounted in bearings 76 and 78 supported on the standard 16. On the lefthand end of the shaft 74 is a chuck 80 corresponding to the chuck 24. Shafts 18 and 74 rotate on the same axis in alignment. As illustrated in FIG. 1 a glass tube to be provided with one or more grooves is mounted in the chucks 20 and 80 and gripped by them to cause rotation of the glass tube on its axis.

A carriage 82 is provided with front and back pairs of grooved rollers 84 positioned to ride on the edges of the I-beam bed 10, as clearly shown in FIG. 3. As shown in FIG. 1, a hand wheel 86 can be connected to one of these grooved rollers so that the carriage can be adjusted along the bed in an obvious manner.

Pivotally mounted on the carriage 82 is a half nut 88 arranged to be moved into and out of engagement with the lead screw 26 in a manner commonly used in lathe constructions.

Extending upwardly from the carriage 82 is a standard 90 on the upper end of which is pivotally mounted a torch support 92. As shown in FIG. 3, the torch support 92 can be swung through a limited axis on the center of the shafts 18 and 74 and locked in various angular positions by means of a thumb nut 96 operating in an arcuate slot 94. Mounted on the torch support 92 are a pair of torches 98 and 100 which are longitudinally spaced along the axis of the tube T. As shown in FIG. 1, each torch is supplied with a pair of fuel supply lines represented by the fuel gas lines G and the air or oxygen lines O.

A pair of vertically adjustable supports 102 are arranged in longitudinally spaced relation on top of the bedplate 10 and support an elongated fuel burner 104 which is positioned, as is clear from FIG. 4, to direct heat onto the glass tube T, substantially throughout its length.

With regard to the torches used for heating the glass tube to form one or two grooves they are for purposes of this disclosure of any suitable form, of which a number of commercially available torches are examples. The torch 100 in the case of FIG. 4, for example, is of the type which produces a more or less round flame in cross-section, which is adjusted to apply heat at a point or limited area of generally circular cross-section, as shown at FR in FIG. 7. At this point it could be noted that other kinds of torches can be used such as one which would produce a ribbon flame applying heat to the glass tube T at a point of limited area of generally rectangular cross-section, as diagrammatically illustrated at F—F in FIG. 5.

In order to get a flame of the proper quality, temperature and shape any suitable form of gaseous fuel such as natural or city gas will be supplied to the torches 98 and 100 through the conduits G—G, which in part of course will have to be flexible because the torches, as will appear later, gradually progress from the lefthand end of the machine to the righthand end. Similarly air or oxygen to aid in the combustion of the fuel will be supplied through the lines O.

As will be understood by those skilled in the art of glass working the various fuels and temperatures of the flames can be varied in control to effect proper working temperatures for the glass. For the sake of completeness it is noted in connection with this case that the glass tubes T where they are to be used for the envelopes of fluorescent lamps, are commonly made of standard formulations of glass known as soda lime bulb glass.

As is well known a range of 450 to 470 degrees C. represents the temperature required to anneal such a glass. Furthermore, the temperature of a glass of this type, represented by the range of 700 to 1000 degrees C., represents the range from the softening point of the glass to its working point. Thus, as will appear hereinafter, these temperature ranges are indicative of the conditions to be met for a glass of this type to get groove formations as will be explained. Those skilled in the art will understand that these various factors can be varied in obvious ways when working with other glass formulations.

In order to convert a glass tube T of this kind from a smooth curvilinear cross-section, as for example from a circular cross-section to provide it with one or more helicoidal grooves, the following operations are carried out with the machine previously described. A smooth wall glass tube T of circular cross-section, for example, is mounted in the chucks 24 and 80. The motor 38 is energized, causing rotation of the tube T on its axis at a suitable number of revolutions per minute. Since the manner in which the conjoint rotation of the chucks 24 and 80 is effected by the mechanism disclosed is obvious, no further description of its operation will be required except to note that the shafts 18 and 74 are caused to rotate together at the same speed because the drive assemblies at each end of the machine driven by the lead screw 26 are identical.

With the glass tube rotating the first operation preferably is to anneal the glass by supplying fuel to the burner 104 through the connection 106. This gives a ribbon of flame as diagrammatically illustrated in FIG. 1, to form along and under the glass tube T. Thus as the tube revolves it is slowly heated and the period of heating in relation to flame temperatures is controlled so that the glass of the tube is annealed and thus prepared against damage by heat shock during further processing.

Figure 2:
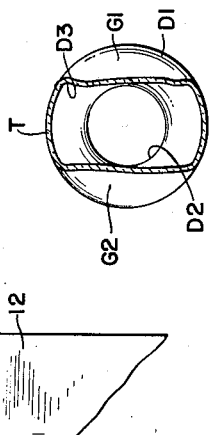
FIGURE 2 is a cross-sectional view taken on the line 2—2 of FIG. 1.

The carriage 82 is then moved to the left to a point where the torch 100 when ignited will start to heat the glass at the point $P^1$ in FIG. 1. At the time torch 100 is turned on the half nut 88 is engaged with the lead screw 26, with the result that the carriage 82 will now start to progress from the point corresponding to $P^1$ slowly towards the right. The relative speeds of rotation of the tube and the lead screw are predetermined so that the rotation of the glass tube T is properly related to the longitudinal movement of the carriage 82 and hence to torch 100 from left to right. The result is that the point of heating FR the wall of the glass tube will gradually progress along a line parallel to the axis of rotation of the tube and since the tube is rotating it will trace out in effect a helical path on the surface of the tube. Rate of heating is controlled so that as indicated in FIG. 2, the glass will quickly be heated in the softening-working range.

It is particularly important to note that the tube T is rotating in a counterclockwise direction when viewed from the plane 4—4, see FIG. 4, that is in a clockwise rotation if viewed from the righthand end. Thus the point of heating FR in FIG. 4 is rising with respect to the horizontal. As a result the softened glass gradually sags radially inwardly to form the groove $G^1$. Conditions are controlled so that by the time the glass of the groove gets around to a point where gravity would be acting in the opposite direction, it will have solidified so as to retain its form. As shown in FIG. 1 the groove in cross-section is generally curvilinear. These operations can continue until the torch reaches a point at the other end of the tube T spaced from its end substantially the distance corresponding to the spacing between the point $P^1$ and the lefthand end of the tube.

In the system shown, however, provision is made to simultaneously form two grooves. Thus the carriage 82 progresses to the right when the torch 98 reaches the point $P^2$, FIG. 1, it is turned on, with the result that the heating area FR for the groove $G^2$ begins at a point displaced 160 degrees from the point $P^1$. Thus the second groove $G^2$ is simultaneously being formed, with the groove $G^1$, except for the overlapped parts at the ends of the tube, as will be obvious.

It is believed, although not with certainty, that the formation of the groove results from the internal surface tension of the glass when softened and from the action of gravity on the softened glass. There is some reason also to believe that possibly the physical pressure of the flame on impingement on the softened glass may also aid in the inward flow of the glass of the wall to form the groove. In any event, proceeding as above described grooves of amazingly uniform cross-sectional shape are formed either singly or in multiple. The depths of the grooves are of course subject to a number of variables the most important of which in relation to the glass formulation is the temperature to which the glass is softened. In observing the machine in operation the groove starts to form within the point or area of flame application FR and increases in depth as the heated point moves upwardly, see FIG. 4, until the glass cools enough to prevent further flow. The cross-sectional shape of the groove can also be controlled by the shape of the point or area of flame application, which one reason for suggesting that the ribbon type of flame can be used to produce the heated area F—F, see FIG. 5.

Another way of controlling the depth and shape of the groove is diagrammatically illustrated in FIG. 6, wherein the torch or torches can be moved to different vertical positions with respect to the horizontal on an arc so that the distance between the torches and the glass tube stays the same. If the flame is put to the lowermost dotted position as illustrated in FIG. 6, the groove which is formed will be shallower than will the groove which will be formed if the flame were placed at the uppermost dotted position. It is believed that this is due in part to the fact that as the heated glass moves upwardly (counterclockwise rotation, FIG. 6) it will be at a lower temperature at the higher points where gravity is acting most strongly so that it will be less deformed. On the other hand by heating it at the higher point the glass will be most plastic when gravity is acting most strongly and a deeper groove will be formed.

FIG. 2 indicates a cross-section of a double groove tube at the plane 2—2 of FIG. 1. It will be seen that the glass wall at this point is substantially rectangular in cross-section. The roots of the grooves are such as to form a straight through passage in the tube, indicated by the circle $D^2$ in FIG. 2, which is of minimum diameter. At the areas between the grooves the glass tube will maintain its maximum diameter, as indicated at $D^1$. It has been possible with this method to make the grooves so deep that they will cross over the axis of the tube T and form a helicoidal chamber enclosed by the envelope.

As those skilled in the art will appreciate by adjustment of the variables involved in this operation considerable modification of the form and depth of the grooves can be effected. Likewise, the grooves need not be smoothly curvilinear in cross-section but may be given other forms in which there are lateral deviations in the curvilinear form such as is mildly indicated at $D^3$ in FIG. 2. These offset formations can be made larger by controlling the flame to form if desired helicoidal offsets which, as those in the incandescent lamp art will understand, may have utility with regard to the mercury vapor contents of such lamps.

It may be noted, although not previously mentioned that after the glass has been heated to annealing temperature by the burner 104, its fuel supply through the line 106 can be cut off so that all heating comes from the torches.

An amazing characteristic of this procedure is that since the heating of the tube during groove formation is at limited areas the overall straightness of the tube is in no way affected. The tube is as uniformly straight throughout its length after the grooves are formed as it was when it was first put into the machine.

As will be understood by those skilled in the art this machine can be fully automated so that the starting and stopping of all parts of the mechanism including turning on and off of the annealing heater and the torches can be automatic for production purposes.

In view of the above disclosure it will be apparent to those skilled in the art that the subject matter of this invention is capable of considerable variation both in the apparatus and in the method, and it is submitted therefore that the embodiments thereof selected for disclosure purposes are given as exemplary. It is intended that the scope of this invention be set out in the appended claims.

We claim:

1. A method of forming at least one helical groove in the wall of a glass tube by displacing the wall along a helical path by heating the wall at a point to a temperature high enough to soften the wall thereat sufficiently so that on subsequent rotation the heated wall will sag inwardly, rotating the gass tube on its axis and progressing the point of heating along a line parallel to the axis of the glass tube at a rate proportioned to the speed of rotation of the glass tube to form a helical groove of predetermined pitch.

2. In the method of claim 1 the additional step of adjusting the point of application of heat to the glass tube vertically with respect to the tube's axis to adjust the depth of the groove form.

3. In the method of claim 1 the additional step of controlling the temperature to which the wall is heated to produce a groove of predetermined depth.

4. In the method of claim 1 said glass tube being rotated in a direction so that the point of heating moves upwardly from the point of heating.

5. A method of generating a plurality of helical grooves in the wall of a glass tube by deforming its wall comprising the steps of rotating the glass tube on its axis, simultaneously applying heat to the wall of the tube at a plurality of longitudinally spaced points along the axis of the tube sufficiently so that the heated wall will sag inwardly along helical paths and advancing said points of heating longitudinally and parallel to the axis of the glass tube, said points of heat application occurring successively initially so that the grooves formed are circumferentially spaced.

References Cited in the file of this patent

UNITED STATES PATENTS

| | | |
|---|---|---|
| 770,599 | Monteagel | Sept. 20, 1904 |
| 1,926,552 | Morgan | Sept. 12, 1933 |
| 2,220,568 | Fishel | Nov. 5, 1940 |
| 2,377,042 | Rosenthal | May 29, 1945 |
| 2,423,113 | Pfleghar | July 1, 1947 |
| 2,452,652 | Hansen | Nov. 2, 1948 |
| 2,504,425 | Keyzer | Apr. 18, 1950 |
| 2,573,300 | Beaumariage et al. | Oct. 30, 1951 |
| 2,615,285 | Gosnell et al. | Oct. 28, 1952 |
| 2,582,818 | Coby | Jan. 15, 1952 |
| 2,696,697 | Wiener et al. | Dec. 14, 1954 |
| 2,781,832 | O'Connor | Feb. 19, 1957 |
| 2,822,501 | Poulter | Feb. 4, 1958 |
| 2,862,335 | Shaw et al. | Dec. 2, 1958 |
| 2,862,337 | Shaw et al. | Dec. 2, 1958 |
| 2,897,545 | Meissner | Aug. 4, 1959 |
| 2,916,645 | Lemmers et al. | Dec. 8, 1959 |
| 3,014,299 | Voloshin | Dec. 26, 1961 |